United States Patent Office 3,351,427
Patented Nov. 7, 1967

3,351,427
VAPOR PHASE PROCESS FOR PRODUCING
METAL OXIDES
Charles B. Wendell, Canton, Clifford Le Roy Carpenter, Wellesley Hills, and Michael J. Greene, Lowell, Mass., assignors to Cabot Corporation, Boston, Mass., a corporation of Delaware
Filed Nov. 1, 1963, Ser. No. 320,879
9 Claims. (Cl. 23—202)

ABSTRACT OF THE DISCLOSURE

This invention is concerned with the production of finely divided solid oxides of metallic elements by means of a pyrogeneous reaction at temperatures above about 1000° F. involving only gaseous reactants and by-products, in which a mixture of free-oxygen containing gas, a fuel gas and vapors of one or more suitably reactive compounds of such metallic elements is introduced into a frusto-conical reaction zone through the smaller end thereof while spinning circumferentially about the central axis thereof at a linear velocity not below about 75 feet per second. The amount of free-oxygen containing gas is at least sufficient to react stoichiometrically with the said reactive compounds and to burn said fuel gas completely. The reacted mixture with the finely divided solid oxide product in suspension is continuously removed through the larger end of the frusto-conical reaction zone and the finely divided solid oxide is recovered therefrom. Novel apparatus for carrying out the process is also disclosed herein.

Figure 1:
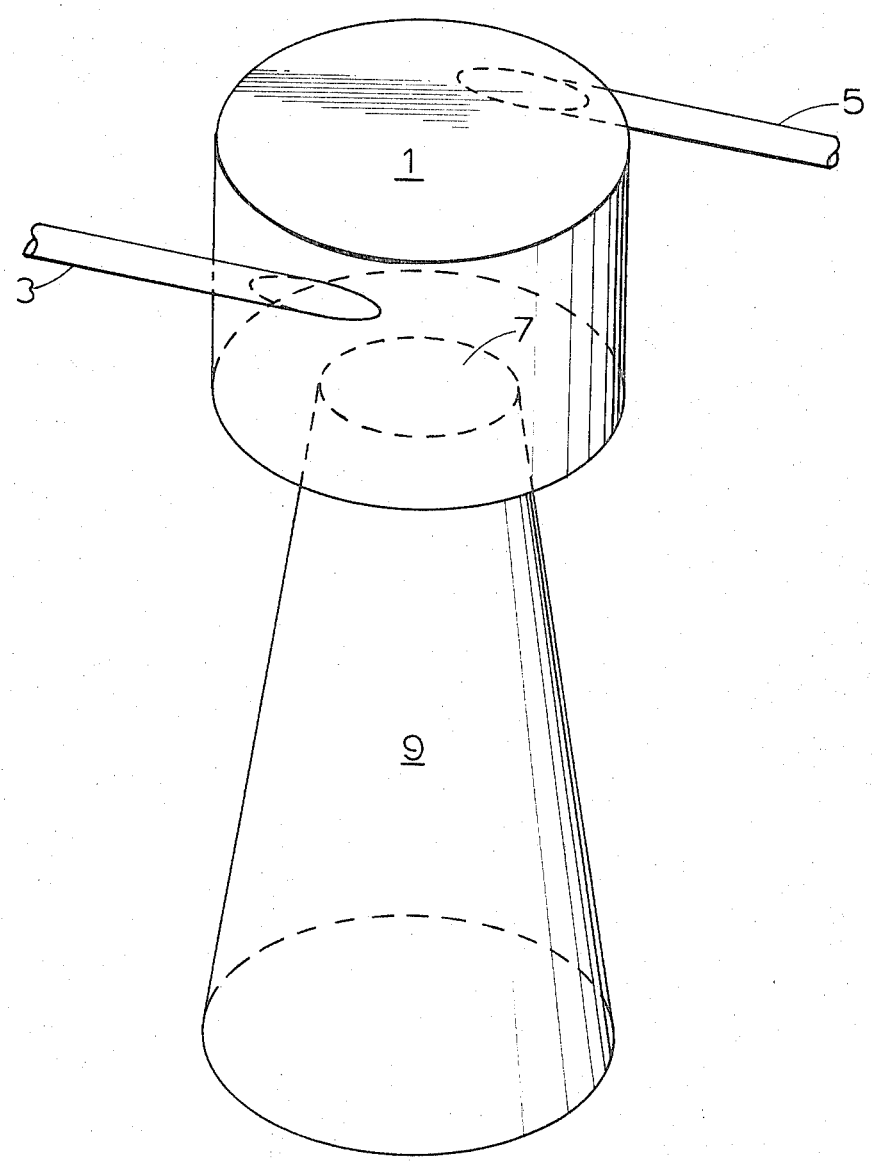

This invention relates to the production of pyrogenic metal oxides and in particular to an improved process for the production of pyrogenic metal oxides such as titanium dioxide.

It is well known that metal oxides can be produced by oxidation at elevated temperatures i.e. above about 1000° F., of a volatile metal compound such as a metal halide or oxyhalide. Equation 1 below is believed to correctly illustrate the type of reaction involved when, for example, titanium tetrachloride is oxidized to produce pyrogenic titanium dioxide.

*Equation 1*

(heat)

$$TiCl_4 + O_2 \rightarrow TiO_2 + 2Cl_2$$

The reaction illustrated by Equation 1 is not normally sufficiently exothermic to be self-sustaining, and accordingly heat is normally supplied by any suitable means although the burning of carbon monoxide and oxygen as illustrated in Equation 2 below is often preferred.

*Equation 2*

$$CO + \tfrac{1}{2} O_2 \rightarrow CO_2 + \text{heat}$$

The resulting overall reaction has been found to be generally suitable for use in the production of pyrogenic metal oxides such as titanium dioxide, zirconium dioxide, ferric oxide, silicon dioxide, stannic oxide, and the like; and particularly suitable in the production of finely-divided oxides of zirconium, iron and titanium. Details of the processes are disclosed in numerous references such as U.S. Patents 2,488,439; 2,488,440 and 2,980,509; and in "Studies on Inorganic Fillers," by Gosta Flemmert published in 1953 by Darlarnes Tiduings-Och Boktrychkeri-AB, Sweden. Said processes and other of similar genre have been found to be extremely advantageous in that the metal oxide products of said processes (a) are not subject to the severe aggregation which normally occurs when metal oxides are produced by wet or liquid phase processes, such as by precipitation from solution, and (b) are recovered relatively readily because there is no need for drying procedures and the like as there is no liquid associated with the product.

However, a serious disadvantage which has heretofore beset the pyrogenic metal oxide producing industry (particularly the titanium dioxide producing industry) resides in the fact that during the continuous production of a metal oxide, accretion of product on the walls of the reactor and/or on the burner assembly frequently occurs. Accretion of the metal oxide product usually results in a number of deleterious effects, such as loss of product quality due to excessive residence time of the metal oxide product in a high temperature environment, non-uniform product due to non-uniform mixing of the reactants through deflection or disturbance of flow patterns of non-mixed reactants, periodic drop-off of wall accretion into the main product stream, localized overheating of equipment due to poor heat transfer through said accretion and plugging of gas entries. In accordance with the present invention, however, these problems have been successfully resolved.

Accordingly, it is a principal object of the present invention to provide an improved process for the production of pyrogenic metal oxides.

It is another object of the present invention to provide an improved process for the production of pyrogenic titanium dioxide.

It is another object to provide improved apparatus for the production of metal oxides.

Other objects of the present invention will in part be obvious and will in part appear hereinafter.

Figure 2:
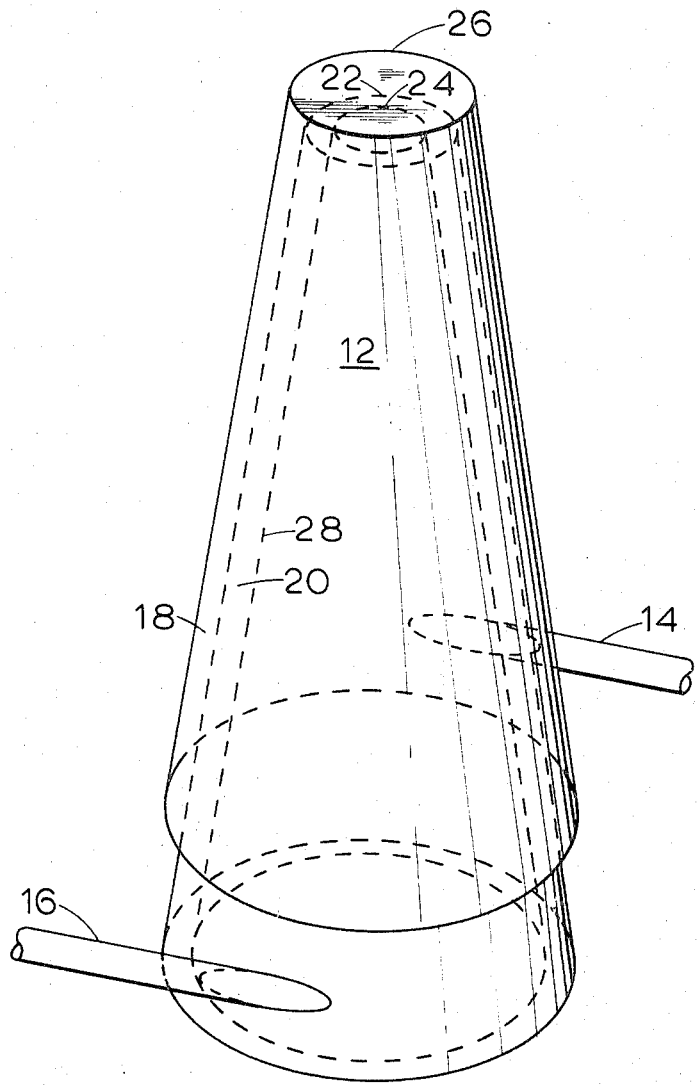

The above and other objects and advantages of the present invention will be more readily understood when reference is had to the accompanying drawings forming part hereof, wherein:

FIGURE 1 is a schematic diagrammatic view of an apparatus of the general type that can be utilized in practicing the present invention, wherein the reactant and fuel gas are premixed so as to produce a spinning mixture which mixture is then introduced into the smaller base of a frusto-conical burner; and FIGURE 2 is a schematic diagrammatic view of a preferred apparatus suitable in practicing the present invention wherein the reactants and the fuel gas are introduced tangentially into separate annuli spaced about the outer surfaces of a frusto-conical zone and the resulting spinning streams are premixed and introduced into the smaller base of the frusto-conical zone.

In accordance with the present invention it has been discovered that the problem of metal oxide accretion within the metal oxide producing burner is substantially eliminated by charging at a linear velocity of between about 75 and about 350 ft./sec., a spinning mixture of the reactants and the fuel gas into the smaller base portion of a relatively unobstructed zone having an essentially frusto-conical configuration. At linear velocities below about 75 ft./sec., deposition of metal oxide product on the internal wall of said zone often occurs whereas at velocities above about 350 ft./sec. the flame produced generally becomes extremely unstable.

The reactants, for the purposes of the present specification comprise (a) a metal compound in vapor form, and (b) a free-oxygen containing gas.

Any metal compound that is volatilizable at temperatures below about 1000° F. is generally suitable for the purposes of the present invention. Definitely preferred, however, are metal halides and oxyhalides such as titanium tetrachloride, zirconium tetraiodide, titanium tetrabromide, silicon tetrachloride, titanium oxychloride, aluminum trichloride, etc., and mixtures thereof. The metal compounds can be introduced into the burner in any suitable manner such as alone, in combination with the free-oxygen containing gas, or with the fuel gases or any component thereof.

Free-oxygen containing gases (i.e. gases containing uncombined oxygen) suitable for the purposes of the present invention are generally obvious. Preferred for use in the process of the present invention, however, are dry oxygen and/or dry air. While the introduction of the free-oxygen containing gas alone is entirely suitable, said gas can, if desired, be mixed with any of the other materials being introduced into the burner and/or can also be mixed with an inert gas such as nitrogen for reasons which will be more fully set forth hereinafter.

Fuel gases, i.e. gases utilized in preheating and/or supplying heat to the burner which are suitable for the purposes of the present invention are generally well known. Specific examples of fuel gases that can be utilized are methane, propane, butane, carbon monoxide, sulfur chlorides, sulfur vapor and the like. Carbon monoxide, however, has generally been found to be highly preferred because it is relatively readily available and because in producing titanium dioxide by the oxidation of titanium tetrachloride, it is generally desirable that fuel gases containing hydrogen be avoided or utilized only in limited quantities.

It is pointed out that in order to efficiently accomplish simultaneously both of the reactions illustrated by Equations 1 and 2 or their equivalents, it is normally necessary to introduce into the burner at least about sufficient free-oxygen containing gas to react stoichiometrically with the metal compound and the fuel gas introduced thereinto. Preferably, an excess of free-oxygen containing gas is introduced.

Apparatus suitable for the practice of the present process is well known to the art although said apparatus has not heretofore been utilized in the production of metal oxides and there was, heretofore, no reason to believe that said apparatus was suitable for the production of metal oxides or offered any advantages therefor. In particular, apparatus of the general type described in U.S. Patent 2,935,840 to F. Schoppe which has been modified as shown in FIGURES 1 and 2 has been found to be suited to the practice of the present invention.

In a typical run, referring now to FIGURE 1, there is introduced into premixing chamber 1 at a linear velocity of about 350 ft./sec. by means of conduit 3 a fuel gas, and by means of conduit 5 a free-oxygen containing gas, and the resulting mixture is caused to spin by the use of any well known means. Said spinning mixture can be produced, for example, simply by introducing the gases into chamber 1 tangentially. In any case, said spinning mixture is then introduced through throat 7 into frustoconical chamber 9 wherein said mixture (having a linear velocity of between about 75 and about 350 ft./sec.) is ignited and thereafter burns preheating chamber 9. After sufficient preheating, the flow of fuel gas in reduced and there is introduced, either by means of conduit 3 and/or conduit 5 or still another conduit, vapors of a metal compound. Thereafter, the reaction is controlled by varying the flow rates of the various gases being introduced into chamber 1.

In a typical run in the preferred apparatus of the present invention, referring now to FIGURE 2, fuel gas is introduced into conduit 14 and a free-oxygen containing gas into conduit 16 (note each of said conduits terminate in an orifice tangentially oriented in the same spin direction) said gases thereafter flowing helically through annuli 18 and 20 respectively and thence into reaction chamber 12 over annular rims 22 and 24 respectively said rims being spaced from wall 26 which defines the small base end of the cone so as to allow said gases to partially premix and to enter chamber 12 while spinning. After ignition, the gaseous helically swirling mixture reacts within chamber 12 preheating said chamber. Next, in addition to the free-oxygen containing gas, vapors of a metal compound are introduced into conduit 16 and the resulting volatilized metal compound/free-oxygen containing gas mixture courses helically through annulus 20 thereby (at low throughputs) being preheated while simultaneously cooling wall 28. After passing over annular rim 24, the gaseous mixture reacts within chamber 12 to produce the corresponding metal oxide. The product then flows out of the burner-reactor and is collected by any suitable means.

It is pointed out that generally the burner should be relatively obstructionless in the area of the reaction zone and should be designed to allow the metal oxide product to exit therefrom with as little obstruction as possible as said product while hot tends to deposit and crystallize upon obstructions. It is also pointed out that in order to allow the reaction involved in the production of the metal oxide to proceed substantially to completion, residence time within the reaction zone should be considered. Residence time within the reaction zone can often be controlled by disposing a burner of the type shown within a reaction chamber.

Although the mechanism of the process of the present invention is not fully understood, it is believed that introduction at a linear velocity of between about 75 and about 350 ft./sec. of all or substantially all of the gases while spinning into a relatively obstructionless frustoconical reaction zone: (1) provides superior blending of the reactants, thereby obviating localized areas of excessive reaction rates and hence localized areas of excessive heat; (2) makes possible the introduction into the burner in a single high speed stream, gases that are extremely reactive toward each other with little danger of flame flashback; and (3) prevents the accretion of substantial metal oxide product on burner assemblies, etc.

Further, when the preferred apparatus of the present invention is utilized i.e. wherein the various gases to be introduced into the burner are flowed helically about the outer walls of the burner, it has been found that the process of the present invention can be readily achieved in an aluminum burner even at low throughputs (for example, at start-up) without raising objectionably the temperature of the walls of the reaction chamber even though no cooling of the burner is provided except for the cooling effect provided by said helically flowing gases. This result is most surprising in view of the fact (a) that temperatures higher than about 4000° F. may exist within the reaction chamber and (b) at low throughputs the walls of the reaction chamber in the absence of annuli (shown in FIGURE 2), or some other means of cooling, can heat up to temperatures that may destroy the burner. In accordance with the apparatus of the present invention wherein annuli are provided, however, lower throughputs can be utilized.

In addition, it has been found that when any substantial percentage, i.e. above about 10% by volume of the gases introduced to the burner are not introduced while spinning, for example when about 25% of the gases are introduced axially at the small base end of the burner, the enormous efficiencies and throughputs of the present invention are either not attainable or are attainable only with difficulty.

A better understanding of the present invention can be had when reference is made to the following example which, however, is illustrative in nature and therefore is not intended to limit the scope of the present invention:

*Example 1*

To the outer annulus of a slightly preheated aluminum burner of the type shown in FIGURE 2, having a 1 inch I.D. larger base, a ½ inch I.D. smaller base, a length of 3 inches and the annuli ¹⁄₁₆ inch wide, there is charged carbon monoxide at a rate of about 100 s.c.f.h. Simultaneously, oxygen at a rate of about 100 s.c.f.h. is introduced into the inner annulus. The resulting mixture is ignited within chamber 12 and the reaction is allowed to continue. Next, volatilized titanium tetrachloride is introduced into the inner annulus at a rate of about 25 s.c.f.h. The reaction is allowed to continue for about 24 hours. Upon shut-down the burner is carefully examined and it is found that wall 28 has only a minor "dusting" of titanium dioxide product accretion thereon. The titanium dioxide produced is good quality.

The materials from which the improved burners of the present invention can be fabricated are subject to considerable variation. Generally, any ceramic compositions, metals or metal alloys which are substantially inert to the temperatures, reactants and products of reaction and are capable of withstanding the thermal shock are suitable. Specific examples of materials that are generally suitable for the fabrication of the apparatus of the present invention are nickel, aluminum, stainless steel, glass, vitreous silica, and the like.

When a burner of the general type shown in FIGURE 2 is to be designed wherein cooling of the burner and preheating of the reactant gas(es) is desired, it is preferable that at least wall 28 be constructed from a substance (i.e. usually a metal) having good heat transfer characteristics in order that rapid heat transfer can be effected between chamber 12 and the gases flowing within the inner annulus. Moreover, it should be borne in mind that although ceramic materials are often satisfactory, ceramic materials often possess relatively low resistance to thermal shock, a factor often encountered in processes directed towards pyrogenic metal oxide production.

Obviously, the design and specifications of the apparatus of the present invention are also variable. However, it should be noted that determination of design specifics, such as the angle of divergence of the frusto-conical walls, length/diameter ratio and the like are, to some extent, dependent upon the particular reaction to be employed and the particular metal oxide to be produced. In short, the particular design and dimensions required for any particular set of conditions can be readily determined when such factors as desired output capability, metal oxide to be produced, specific reactants to be utilized, heats of formation and the like are taken into account.

Obviously, many changes can be made in the above example, description and drawings without departing from the scope of the invention. For instance, it is entirely suitable that each of the reactants and fuel gas(es) be conveyed separately into the burner through a plurality of annuli. Thus, although in the above example, oxygen and titanium tetrachloride are charged to the burner through a common conduit and annulus, separate conduits and/or annuli can also be provided for the conveyance of each of said reactants. Moreover, other fuel gases can be used either in combination or separately although it should be borne in mind that the use of hydrogen containing fuel gases is not generally desirable where pigment grade titanium dioxide is the product to be produced.

In those cases wherein apparatus of the type shown in Example 1 is utilized, it is obvious that the walls of the burner can be cooled by any suitable means such as by means of a water jacket.

When it is desirable that the reactants entering the burner be diluted without greatly disturbing the mass flow rates of the gases, said reactants can be diluted with an inert gas, such as nitrogen or helium prior to or during the charging of said reactants to the burner. Thus, it is possible to retain a given mass flow rate while reducing the flow of reactants and/or fuel gases.

Also, although for the purposes of clarity and brevity no mention was made in the above example or description of nucleating agents, it is well known in the art that it is often desirable to "seed" a metal oxide producing reaction zone with a nucleating agent, such as, for instance, in the production of titanium dioxide, aluminum trichloride. Additives which are generally added to the burner in minor amounts i.e. additives which comprise less than about 10% by volume of the total gas flow, can obviously be added to the flame tangentially, or as part of a spinning mixture, or, if desired, axially at the small base end of the burner.

Finally, it is obvious that a hybrid of the burners illustrated in FIGURES 1 and 2 is within the scope of the present invention, although the burner illustrated in FIGURE 2 is greatly preferred.

Accordingly, it is intended that the above disclosure be regarded as illustrative and as in no way limiting the scope of the invention.

What we claim is:

1. In a process for producing finely divided solid oxides of metallic elements by reacting at temperatures above about 1000° F. a free-oxygen containing gas and vapors of a compound of such metallic element which compound vaporizes at temperatures below 1000° F., forming vapors which are stable to at least 1000° F. and reactive with free oxygen at temperatures above 1000° F. to form the corresponding solid oxide, the improvement which comprises introducing into a laterally enclosed frusto-conical reaction zone through the smaller end thereof a mixture of free-oxygen containing gas, a fuel gas and vapors of said compound of such metallic element while said mixture is spinning circumferentially about the central axis of said reaction zone at a linear velocity not below about 75 feet per second, the amount of said free-oxygen containing gas being at least sufficient to react stoichiometrically with said compound and burn said fuel gas completely, removing from said reaction zone through the larger end thereof the reacted mixture containing the finely divided solid oxide product suspended therein as the sole solid component and recovering the finely divided solid oxide.

2. The process of claim 1 in which the linear velocity of said spinning mixture as it enters said frusto-conical reaction zone is between about 75 and about 350 feet per second.

3. The process of claim 1 wherein said fuel gas is carbon monoxide and said free-oxygen containing gas is chosen from the group consisting of oxygen and air.

4. The process of claim 1 wherein said compound is chosen from the group consisting of titanium, zirconium and iron compounds.

5. The process of claim 1 wherein said compound is titanium tetrachloride.

6. In the process of producing pyrogenic metal oxides by reacting at temperatures above about 1000° F. a free-oxygen containing gas and vapors of a metal compound which vaporizes at temperatures below 1000° F., forming vapors which are stable to at least 1000° F. and reactive with free-oxygen at temperatures above 1000° F. to form the metal oxide desired, the improvement which comprises flowing a stream of a fuel gas and a completely separated stream of a free-oxygen-containing gas helically around the outside of a major portion of a laterally enclosed and internally substantially unobstructed frusto-conical reaction zone which is open at both ends, at least one of said streams containing said metal compound in vapor form, said free-oxygen-containing stream containing sufficient oxygen to react stoichiometrically with said metal compound and said fuel gas, thereafter commingling said streams in a confined space communicating directly with the smaller open end of said frusto-conical reaction zone with both streams spinning in the same direction, flowing the resulting spinning mixture at a linear velocity not substantially below 75 feet per second into said reaction zone through the smaller end thereof, removing the reaction products including particulate metal oxide through the larger end of said zone, and recovering the particulate metal oxide from said products.

7. The process of claim 6 wherein the linear velocity of said spinning mixture as it enters the smaller end of the frusto-conical reaction zone is between about 75 and about 350 ft./sec.

8. The process of claim 6 wherein said fuel gas is carbon monoxide and said free-oxygen containing gas is chosen from the group consisting of oxygen and air.

9. The process of claim 6 wherein said metal compound is chosen from the group consisting of titanium, zirconium and iron compounds.

References Cited

UNITED STATES PATENTS

| | | | |
|---|---|---|---|
| 2,445,691 | 7/1948 | Pechukas | 23—202 |
| 2,890,929 | 6/1959 | Rummert | 23—1 |
| 2,935,840 | 5/1960 | Schoppe | 23—182 |
| 3,021,195 | 2/1962 | Podschus et al. | 23—182 |
| 3,086,851 | 4/1963 | Wagner | 23—182 |

OSCAR R. VERTIZ, *Primary Examiner.*

H. T. CARTER, *Assistant Examiner.*